United States Patent Office 3,182,072
Patented May 4, 1965

3,182,072
N-[(4-ANILINOANILINO)METHYL]MALEIMIDE
Elbert C. Ladd, Passaic, N.J., assignor to United States Rubber Company, New York, N.Y., a corporation of New Jersey
No Drawing. Filed May 17, 1962, Ser. No. 195,408
1 Claim. (Cl. 260—326.5)

This invention relates to a new chemical compound, namely N-[(4-anilinoanilino)methyl]maleimide, and to the method of preparing same.

The subject compound, N-[(4-anilinoanilino)methyl]maleimide, is represented by the formula:

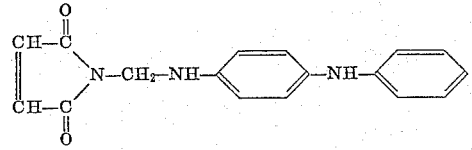

According to the invention, said compound can be prepared by reacting N-methylolmaleimide with N-phenyl-p-phenylene diamine in an inert solvent. The reaction may be illustrated as follows:

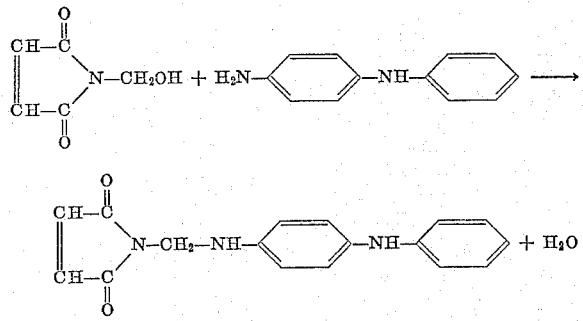

The compound of this invention, N-[(4-anilinoanilino)methyl]maleimide, may be used as an antioxidant in rubbers.

The following examples illustrate the invention:

Example I 25.4 grams of N-methylol maleimide were dissolved in 200 ml. of dioxane and placed in a 500 ml. flask. To this solution were added 36.8 grams of N-phenyl-p-phenylene diamine and the mixture refluxed for one hour. The resultant solution was concentrated to one-half its volume and diluted with petroleum ether. An orange-yellow product, N-[(4-anilinoanilino)methyl]maleimide, was recrystallized from benzene and had a melting point of 125°–126° C.

Analysis for $C_{17}H_{15}N_3O_2$: percent N calculated=14.34; percent N found=14.13.

Example II

This example demonstrates the use of N-[(4-anilinoanilino)methyl]maleimide as an antioxidant in rubber stocks, particularly Hevea rubber stocks. Natural rubber (smoked sheet #2) was compounded conventionally with filler and pigment in standard sulfur-accelerator recipes containing 2.0 parts of N-[(4-anilinoanilino)methyl]maleimide. By way of comparison, similar stocks were prepared by replacing this chemical, in one case, with a well-known antioxidant combination such as BLE and JZF, and, in the other case, with no antioxidant. All the ingredients except the sulfur and accelerator were assembled and mixed in the Banbury. Discharge temperature was 275°–300° F. The sulfur and accelerator were added on a cool two-roll mill. All stocks were cured in a press at 293° F. and tested by the conventional testing methods used for rubber.

| Stock | 1 | 2 | 3 |
|---|---|---|---|
| Smoked Sheet #2 | 100.0 | 100.0 | 100.0 |
| High abrasion furnace carbon black | 45.0 | 45.0 | 45.0 |
| Stearic acid | 2.0 | 2.0 | 2.0 |
| Zinc oxide | 3.0 | 3.0 | 3.0 |
| Asphaltum | 6.0 | 6.0 | 6.0 |
| N-cyclohexyl-2-benzothiazole sulfenamide (accelerator) | 0.75 | 0.75 | 0.75 |
| Sulfur | 2.75 | 2.75 | 2.75 |
| BLE [a] | 2.0 | | |
| JZF [b] | 0.35 | | |
| N-[(4-anilinoanilino)methyl]maleimide | | 2.0 | |

[a] Reaction product of acetone and diphenylamine. (Marketed by Naugatuck Chem. Div., U.S. Rubber Co.)
[b] N,N'-diphenyl-p-phenylenediamine. (Marketed by Naugatuck Chem. Div., U.S. Rubber Co.)

The following table shows the results of tests made on the cured stocks before and after aging in air and in the presence of oxygen.

| Physical Properties | | 1 | 2 | 3 |
|---|---|---|---|---|
| Unaged: | | | | |
| Tensile Strength (p.s.i.) | 30' | 4,350 | 3,920 | 4,255 |
| | 45' | 4,170 | 3,960 | 4,210 |
| | 90' | 3,865 | 3,750 | 3,875 |
| Elongation @ Break (percent) | 30' | 550 | 580 | 520 |
| | 45' | 540 | 600 | 530 |
| | 90' | 560 | 610 | 510 |
| Modulus @ 200% (p.s.i.) | 30' | 775 | 750 | 850 |
| | 45' | 725 | 625 | 800 |
| | 90' | 625 | 540 | 725 |
| Aged in Air—72 hrs. @ 212° F.: | | | | |
| Tensile Strength (p.s.i.) | 30' | 1,710 | 2,105 | 1,330 |
| | 45' | 1,710 | 1,780 | 1,155 |
| | 90' | 1,635 | 1,585 | 1,265 |
| Elongation @ Break (percent) | 30' | 230 | 320 | 230 |
| | 45' | 220 | 290 | 230 |
| | 90' | 250 | 290 | 270 |
| Modulus @ 200% (p.s.i.) | 30' | 1,325 | 1,100 | 1,000 |
| | 45' | 1,275 | 1,015 | 950 |
| | 90' | 1,075 | 900 | 850 |
| Aged—96 hrs. in Oxygen Bomb: | | | | |
| Tensile Strength (p.s.i.) | 30' | 2,900 | 2,835 | 935 |
| | 45' | 2,315 | 2,765 | 870 |
| | 90' | 2,315 | 2,345 | 1,630 |
| Elongation @ Break (percent) | 30' | 420 | 470 | 310 |
| | 45' | 370 | 450 | 300 |
| | 90' | 380 | 450 | 360 |
| Modulus @ 200% (p.s.i.) | 30' | 975 | 825 | 550 |
| | 45' | 950 | 775 | 570 |
| | 90' | 835 | 730 | 625 |
| Aged—144 hrs. in Oxygen Bomb: | | | | |
| Tensile Strength (p.s.i.) | 30' | 2,275 | 2,250 | 355 |
| | 45' | 2,010 | 1,925 | 530 |
| | 90' | 1,835 | 1,565 | 870 |
| Elongation @ Break (percent) | 30' | 360 | 410 | 180 |
| | 45' | 340 | 400 | 230 |
| | 90' | 340 | 360 | 280 |
| Modulus @ 200% (p.s.i.) | 30' | 925 | 815 | 300 |
| | 45' | 890 | 775 | 315 |
| | 90' | 780 | 650 | 375 |

Having thus described my invention, what I claim and desire to protect by Letters Patent is:

N-[(4-anilinoanilino)methyl]maleimide.

References Cited by the Examiner
UNITED STATES PATENTS

| | | | |
|---|---|---|---|
| 1,915,334 | 6/33 | Salzberg et al. | 260—243 |
| 2,425,320 | 8/47 | Hill | 252—149 |
| 2,710,872 | 6/55 | Thompson | 260—326.5 |
| 2,726,249 | 12/55 | Middleton | 260—326.5 |
| 2,743,260 | 4/56 | Tawney | 260—326.5 |
| 2,998,468 | 8/61 | Wilde et al. | 260—800 |
| 3,024,217 | 3/62 | Kibler | 260—45.8 |

IRVING MARCUS, *Primary Examiner.*
NICHOLAS S. RIZZO, *Examiner.*